United States Patent [19]

Abbott

[11] Patent Number: 4,509,969
[45] Date of Patent: Apr. 9, 1985

[54] BLOWHEAD APPARATUS

[75] Inventor: Vaughan Abbott, North Granby, Conn.

[73] Assignee: Emhart Industries, Inc., Farmington, Conn.

[21] Appl. No.: 472,361

[22] Filed: Mar. 4, 1983

[51] Int. Cl.³ .............................................. C03B 9/36
[52] U.S. Cl. ...................................... 65/300; 65/239; 65/264
[58] Field of Search .................. 65/237, 238, 239, 240, 65/241, 300, 264

[56] References Cited

U.S. PATENT DOCUMENTS

| | | | |
|---|---|---|---|
| 2,576,191 | 11/1951 | Pond | 65/264 |
| 3,834,884 | 9/1974 | Kurokawa et al. | 65/264 |
| 4,057,412 | 11/1977 | Schaar | 65/240 |
| 4,137,061 | 1/1979 | Mallory et al. | 65/241 |
| 4,339,264 | 7/1982 | Dahms | 65/239 |
| 4,417,915 | 11/1983 | Dahms | 65/238 |

Primary Examiner—William F. Smith
Assistant Examiner—Michael K. Boyer
Attorney, Agent, or Firm—H. Samuel Kieser

[57] ABSTRACT

A blowhead apparatus including a blowhead arm and a blowhead body having at least one blowhead therein. The blowhead body is removably connected to the blowhead arm. The blowhead includes a retaining member, a seating member mounted on a sealed bearing, and a sealing ring having a seating surface mating with a seating surface on the seating member. A fluid system for supplying high and low pressure air includes a sealed pilot operated shuttle valve for controlling the high and low pressure air, a pilot valve for controlling the shuttle valve, and an on-off valve for the low pressure air.

4 Claims, 4 Drawing Figures

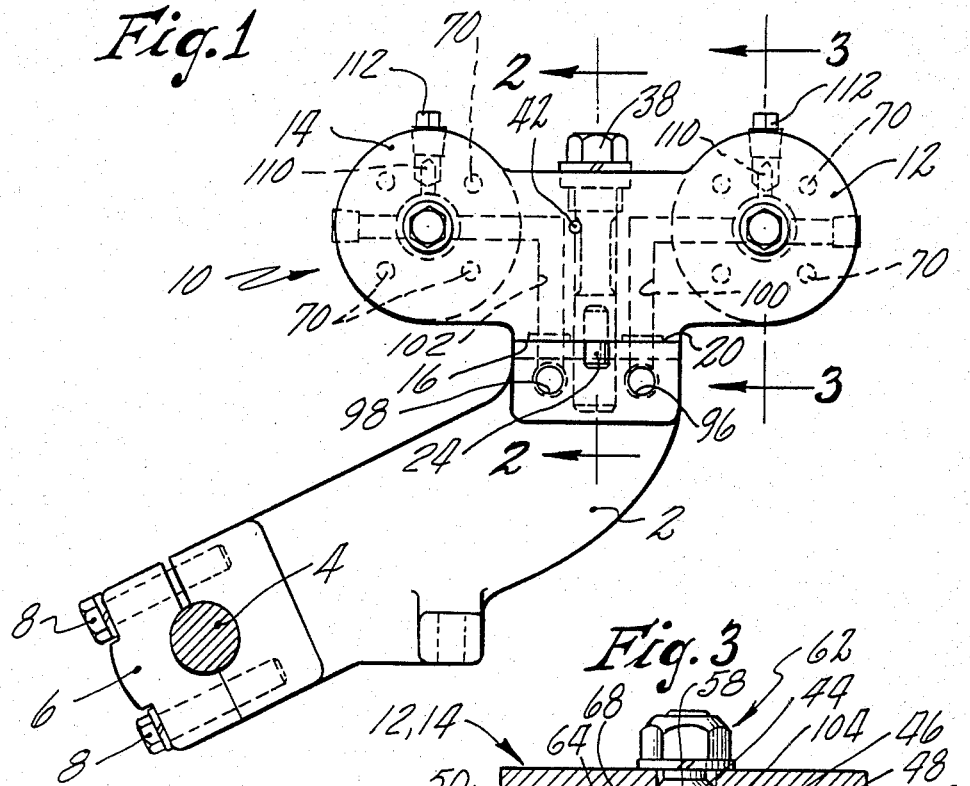
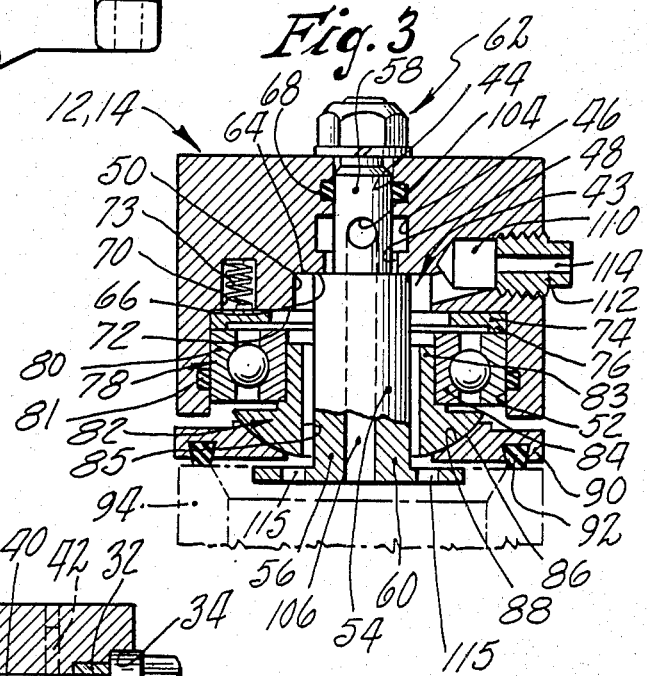
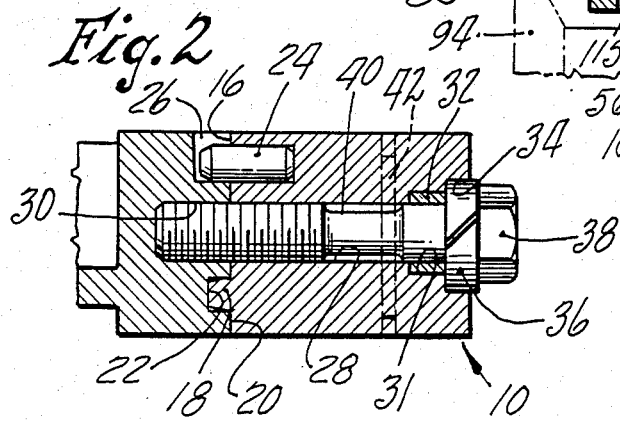

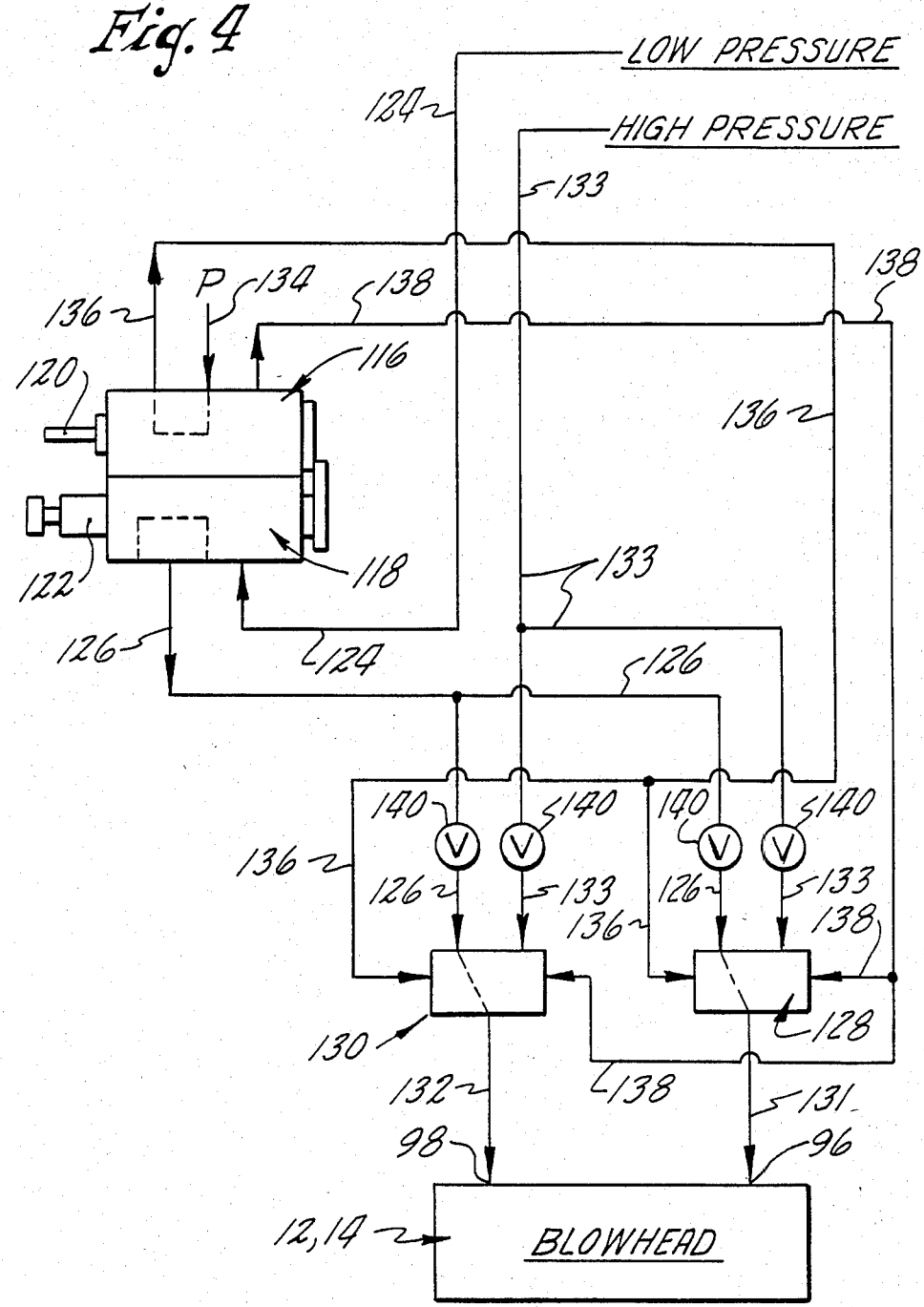

BLOWHEAD APPARATUS

BACKGROUND OF THE INVENTION

This invention relates generally to an improved blowhead apparatus. More particularly, this invention relates to an improved blowhead apparatus for use with a glass forming machine of the press and blow type which is a single table, continuous rotary motion machine having a plurality of individual forming units mounted for rotation about the axis of the machine. This type of machine is shown in U.S. Pat. No. 1,979,211 which issued on Oct. 30, 1934 to G. E. Rowe. Machines of this type are commonly used in the glass industry today and are known as the "Emhart H-28 Machine." The type of machine shown in the U.S. Pat. No. 1,978,211 is a single gob machine. That is, at each forming unit, only one piece of ware is produced during a single cycle of each forming unit.

An improved version of this machine is disclosed in U.S. Pat. No. 4,339,264 issued to Francis A. Dahms on July 13, 1982, which patent is hereby incorporated by reference in this disclosure in its entirety. This type of machine shown in the patent is a double gob machine. That is, it forms two articles of ware during one cycle of each given forming unit.

The apparatus shown in the U.S. Pat No. 4,339,264 utilized a blowhead apparatus which formed the parisons or preforms of glass into the final article. However, with this blowhead, there was a tendency for parts of the blowhead apparatus to wear excessively, there was leakage of blow air in the system, leakage of high pressure blow air into the parison during the low pressure blow portion of the forming cycle, and the device was cumbersome to remove for maintenance.

SUMMARY OF THE INVENTION

In view of the above, it is an object of the present invention to provide an improved blowhead apparatus.

More specifically, it is an object of the present invention to provide a blowhead mechanism in which the possibility of high pressure air being mixed with low pressure air is minimized.

Yet another object of the present invention is to provide a blowhead mechanism in which leakage of air during the blowing operation is minimized.

A still further object of the invention is the provision of a blowhead mechanism in which the blowheads may be quickly and easily removed from the forming machine.

According to one feature, a blowhead apparatus is provided, comprising a blowhead arm and a blowhead body having at least one blowhead therein. Means are provided for removably connecting said blowhead body to the blowhead arm.

According to another feature, a blowhead is provided comprising a blowhead body having at least one cavity therein. A retainer member is secured in the cavity and extends therefrom. A retainer member has a body portion and a flange at the end of the body portion outside of the cavity. A seating member is provided having a bore surrounding said body portion, the wall of the bore being spaced from the body portion. A sealed bearing having an inner and outer race is mounted in the cavity with the inner race being sealingly secured to the seating member and the outer race having sliding engagement with the wall of the cavity. A seating member has a seating surface which mates with a seating surface on a sealing ring. Means are provided for biasing the bearing, seating member and sealing ring toward the flange.

Another feature resides in a fluid system for supplying low and high pressure blowing air to a blowhead apparatus of a glassware forming machine. A system includes a pilot valve having an inlet adapted to be connected to a source of pilot air and a shut off valve adapted to be connected to a source of low pressure air. At least one pilot operated valve having one inlet for connection to a source of high pressure air, a second inlet connected to the shut off valve and an outlet for connection to a blowhead apparatus is provided. Each pilot operated valve is movable beween a first position wherein the outlet is connected to one of its inlets and a second position where the outlet is connected to the other of its inlets. The pilot valve is movable between a first position wherein the pilot air can flow to the shuttle valve to move it to its first position and a second position wherein the pilot air flows to the shuttle valve to move it to its second position. The shut off valve is movable between a first position wherein low pressure air is blocked and a second position wherein low pressure air can flow to the shuttle valve.

DESCRIPTION OF THE DRAWINGS

FIG. 1 is a top plan view of the improved blowhead apparatus of the present invention.

FIG. 2 is a cross-sectional view taken along the lines 2—2 of FIG. 1.

FIG. 3 is a cross-sectional view taken along the lines 3—3 of FIG. 1.

FIG. 4 is a schematic flow diagram for the high and low pressure blow air.

DETAILED DESCRIPTION

According to the present invention, the blowhead apparatus includes a blowhead arm 2 connected to a blowhead shaft 4 by means of a blowhead arm cap 6 which is attached to the end of the blowhead arm 2 by means of bolts 8. The blowhead shaft 4 may be part of the blowhead mechanism shown and described in U.S. Pat. No. 4,339,264. A blowhead body 10, having two blowheads 12 and 14 therein is removably attached to the other end of the blowhead arm 2.

The blowhead body 10 is provided with a flat rear face 16 having a horizontally disposed rib 18 extending outwardly therefrom. The blowhead arm 2 is provided with a mating flat face 20 which has a horizontally extending slot 22 therein which mates with the rib 18 of the blowhead body 10. A locating dowel 24 extends from the face 16 of the blowhead body 10 and is adapted to extend into a locating opening 26 in the blowhead arm 2. As will be noted in FIG. 2, this opening 26 opens both from the top and the face 20 of the blowhead arm 2. A horizontally extending bore 28 extends through the blowhead body 10 and aligns with threaded bore 30 in the blowhead arm 2. The outer end of the bore 28 has a counterbore 31 therein in which is mounted a bushing 32. A second counterbore 34 has a lock washer 36 mounted therein. A hex headed captive screw 38 extends in the bore 28 and is threaded into the bore 30 of the blowhead arm 2 whereby the blowhead body 10 is securely held to the blowhead arm 2. The screw 38 includes a cutaway portion 40 which receives a vertically extending roll pin 42 which renders the screw captive.

With this arrangement, if any parts of the blowhead body 10 or blowheads 12 and 14 become worn, or if for any other reason, it is desired to remove the blowhead body 10, this may be easily achieved, even when the machine is running, by simply unscrewing the screw 38 until it is clear of the bore 30 of the blowhead arm 2 and the blowhead body 10 can then be removed and a new blowhead body 10 can be installed by aligning it with the blowhead arm 2 and the screw retightened.

Referring to FIG. 3, each of the blowheads 12 and 14 include a thrubore 43 having a series of wall portions of varying diameter in the blowhead body 10. The wall portions include, from top to bottom, an upper wall portion 44 of relatively small diameter, a wall portion 46 of larger diameter, a wall portion 48 of smaller diameter than wall portion 46, a wall portion 50 of larger diameter then wall portion 48, and a lower relatively larger wall portion 52. A retaining member 54 extends through the thrubore 43 and includes a body portion 56, a shaft portion 58 extending upwardly from the body portion 56 and flange portion 60 at the lower end of the body portion 56 positioned outside the blowhead body 10. A lock washer and nut assembly 62 attached to the shaft portion 58 secures the retaining member 54 in the blowhead body 10 and draws the upper end 64 of the body portion 56 against the surface 66 between the wall portions 48 and 50. A ring seal 68 is provided in wall portion 44 to seal the upper portion of the shaft portion 58.

A series of bores 70 extend upwardly from the surface 72 formed between wall portions 50 and 52. A spring member 73 is mounted in each of these bores and urges downwardly a spring plate 74 having an outer flange 76 on its bottom surface. A sealed bearing 78 is mounted in the wall portion 52 below the spring plate 74 and has its outer race 80 in sliding engagement with the wall portion 52. A ring seal 81 is provided in wall portion 52 to provide a seal between the outer race 80 and the wall portion 52. A seating member 82 has a portion 83 connected to the inner race 84 of the bearing 78 by a press fit to provide a sealed joint therebetween. The seating member also includes a circular bore 85 of greater diameter then the outside diameter of the body portion 56 of retaining member 54. The seating member 82 has a lower spherical seat 86 which mates with a spherical seat 88 on a sealing ring 90. The bottom surface of the sealing ring 90 has a circular seal 92 mounted therein for sealing engagement with the top surface of a plunger holder 94 as more fully described in U.S. Pat. No. 4,339,264.

When the blowheads 12 and 14 are removed from the plunger holder 94, the spring members 73 urge the spring plate 74 downwardly, the flange 76 of which acts upon the outer race 80 of the bearing member 78 to urge the bearing member 78, seating member 82 and sealing ring 90 downward until the sealing ring 90 abuts the upper surface of the flange portion 60 of the retaining member 54. When the blowhead 12 and 14 are positioned against the plunger holder 94, the sealing ring 90, sealing cone 82, bearing member 78 and spring plate 74 all move upwardly relative to the retaining member 56, and the conical joint between the sealing ring 90 and sealing cone 82 compensates for any misalignment between the blowhead body 10 and plunger holder 94.

The blowhead arm 2 is provided with inlet ports 96 and 98 for connection to a source of blowing air. These ports 96 and 98 lead to each of the blowheads 12 and 14 respectively. The port 96 connects with a passage 100 in the blowhead 12 which leads to the chamber defined by wall portion 46. Similarly, a passage 102 in the blowhead body 10 leads to a similar chamber in blowhead 14.

The shaft portion 58 of the retaining member 54 is provided with a radially extending inlet port 104 in the area of the wall portion 46 and an axially extending passageway 106 extending from the port 104 to the bottom surface of the flange portion 60. An exhaust port 110 extends from the wall portion 50 to the outside of the blowhead body 10. A plug member 112 is provided in the exhaust port 110 and is provided with an axial bore 114 to permit air to exhaust. This bore 114 may be of varying diameters depending upon the job or, the plug member 112 may be solid to prevent any exhaust.

Blow air enters the parison being blown through the passageway 106 in the retaining member 54 and exhausts around the flange portion 60 and through a series of holes 115 in the flange portion up between the body portion 56 of the retainer member 54 and bore 85 of the sealing cone 82, and out through port 110. The seals 68 and 81, along with the sealed bearing 78 and sealing fit between the inner race 80 and the seating member 82 tend to prevent undesired leakage of blow air.

Blow air is provided to the ports 96 and 98 of the blowhead arm 2 by means of a system schematically depicted in FIG. 4. A cam actuated pilot valve 116 and a cam operated shut-off valve 118 are mounted in the machine section in a position so that their valve rods 120 and 122 can be operated by actuators or cam followers mounted on the machine unit which in turn are controlled by cams on the cam drum as more fully described in U.S. Pat. No. 4,339,264. The source of low pressure air is connected to the inlet side of the cam operated shut-off valve 118 by means of line 124. The outlet side of the cam operated shut-off valve 118 is connected by line 126 to two sealed pilot operated selector valves 128 and 130. The single outlet of selector valve 128 is connected to port 96 by a line 131 while the single outlet of the selector valve 130 is connected to inlet port 98 by line 132. A source of high pressure air is connected to the second inlet of each of the sealed selector valves 128 and 130 by line 133. The inlet of the cam operated pilot valve 116 is attached to a source of regulated pilot air by means of line 134.

One outlet of the cam operated pilot valve 116 is connected to one side of each of the sealed selector valves 128 and 130 by line 136. The other outlet of the cam operated pilot valve 116 is connected to the other side of each of the sealed selector valves 128 and 130 by line 138. A manual control valve 140 may be provided in each of the inlet lines to both of the sealed selector valves 128 and 130 as shown so that both high and low pressure air for each blowhead may be adjusted.

In operation, during the period of time that no blow air is needed, the cam operated pilot valve 116 is positioned to allow pilot air to flow through line 136 to the sealed selector valves 128 and 130 to position them such that the line 126 coming from the cam operated shut-off valve 118 is connected to the blowheads. The cam operated shut-off valve 118 is positioned in its closed position so no air flows to the selector valves 128 and 130 through line 126.

When blow air is desired, a cam actuates the shut-off valve 118 to its on position and low pressure air flows through line 126, selector valves 128 and 130, lines 131 and 132 to the inlet ports 96 and 98 of the blowheads. When high pressure air is called for, a cam moves the pilot valve 116 to its second position wherein pilot air flows through line 138 to move the sealed selector valves 128 and 130 to their second position wherein the high pressure line 133 is connected to lines 131 and 132 to permit high pressure air to flow to the inlet ports 96 and 98. At the end of the blowing process a cam returns the low pressure shut-off valve 118 to its off position. The movement of the shut off valve 118 to its off position causes the cam operated pilot valve 116 to move to its first position so that air flows through line 136 to shift the selector valves 128 and 130 to their first position thereby shutting off the high pressure air.

While reference has been made above to specific embodiments, it will be apparent to those skilled in the art that various modifications and alterations may be made thereto without departing from the spirit of the present invention. Therefore, it is intended that the scope of this invention be ascertained by reference to the following claims.

What is claimed is:

1. A blowhead in a glassware forming machine comprising a blowhead body, at least one cavity in said body, a retaining member secured in the cavity and extending therefrom, said retaining member having a body portion and a flange at the end of the body portion outside of said cavity, a seating member having a bore surrounding said body portion, the wall of said bore being spaced from said body portion, a sealed bearing having an inner and outer race, said inner race being sealingly secured to said seating member and said outer race having sliding engagement with the wall of said cavity, sealing means between said outer race and the wall of said cavity, said seating member having a seating surface, a sealing ring having a seating surface mating with said seating surface on said seating member, and means biasing said bearing, sealing member and sealing ring toward said flange.

2. The blowhead of claim 1 wherein said seating surfaces are conical.

3. The blowhead of claim 1 further including a fluid passageway in said retaining member having one end exhausting from said flange and the other end communicating with a fluid passageway in said blowhead body.

4. The blowhead of claim 3 further including an exhaust port communicating with the bore in said seating member.

* * * * *